Patented Nov. 11, 1941

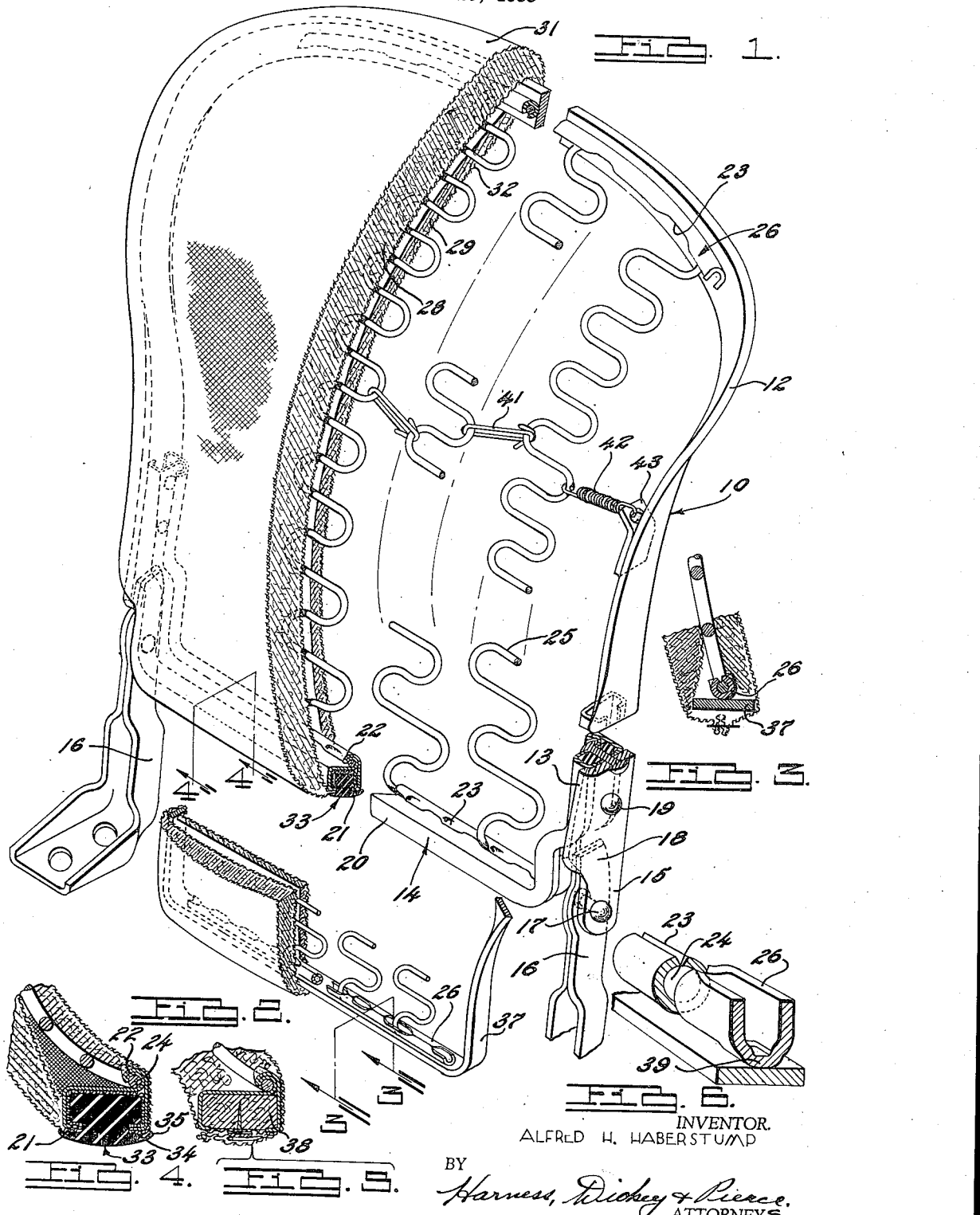

2,261,996

UNITED STATES PATENT OFFICE 2,261,996

SEAT BACK CONSTRUCTION

Alfred H. Haberstump, Detroit, Mich., assignor to The Murray Corporation of America, Detroit, Mich., a corporation of Delaware Application March 25, 1938, Serial No. 198,023

2 Claims. (Cl. 155—179)

My invention relates to cushion constructions, and particularly to a cushion back construction of the bucket type which may be rigid or tiltable.

In the co-pending application of N. C. Clark, Serial No. 168,386, filed October 11, 1937, and assigned to the assignee of the present invention, a form of bucket seat back was illustrated, described, and claimed having a frame of tubular construction for supporting spring strips of sinuous form, similiar to those illustrated and described in the Kaden Patent No. 2,002,399, issued May 21, 1935, under which the assignee has an exclusive license for automotive vehicle use. The cover material is combined with the padding and formed in the shape of a pocket to be stretched over the frame and secured at the bottom thereof.

In practicing my invention, I employ a similar construction in which the frame of the seat back comprises a strap which may constitute the entire contour of the back, or which may be combined with other elements to form the unit back frame. The strap is bent to the desired contour to outline the sides and top of the back having the lower side edges flanged inwardly to form a shoulder for receiving a lower cross member which may be riveted or otherwise secured thereto to complete the frame of the seat back.

The downwardly extending ends of the strap outlining the sides and top of the back may further be extended and rigidly secured to a base, or may be pivoted on supporting elements to permit the back to be tilted thereon. The supporting elements project above their pivots to be engaged by the flanged portion of the strap to provide a stop for limiting the rearward pivotal movement of the back.

The member spanning the strap at the bottom may be of channel formation, having a rolled edge which is crimped at spaced points to provide recesses for receiving the ends of the spring elements. A resilient strip of rubber, a sinuously formed wire, or the like, may be utilized for locking the trim material within the channel. It is within the concept of my invention to employ a tacking strip within the channel to have the ends of the trim material tacked thereto.

A strap may be employed to span the lower end of the inverted U-shaped frame which outlines the side and top of the back, having a channel element welded or otherwise secured thereto for receiving and supporting the ends of the spring elements. A tacking strip may be secured to the underside of the strap to which the trim material may be tacked or the material may be joined below the strap and stitched or otherwise secured together at the bottom.

Accordingly, the main objects of my invention are; to form a frame for the sides and top of a seat back from a strip of material, the ends of which extend downwardly and form a support therefor; to utilize a channel element to span the bottom of an inverted U-shaped strap outlining the back of a seat to provide securing means for the trim material which is drawn thereover; to flange the ends of the inverted U-shaped strap to form shoulders against which a spanning element is rigidly secured; to pivot the ends of an inverted U-shaped strap outlining a seat back on rigid supports having the ends projecting above the pivot thereof in a position to engage projections on the strap to limit the movement of the seat back in one direction; to provide a back frame for supporting spring strips which has means at the bottom thereof for receiving and retaining the ends of trim material which is drawn thereover; to provide a frame for a seat back made entirely from a strip of metal having means for securing spring strips thereacross all of which is covered by trim material of pouch-like formation which is drawn over the frame and stitched or otherwise secured below the bottom strap; and in general, to provide a seat back which is rigid in construction, which provides the desirable resiliency and which is economical of manufacture.

Other objects and features of novelty of my invention will be either specifically pointed out or will become apparent when referring, for a better understanding of my invention, to the following description when taken in conjunction with the accompaying drawing, wherein:

Figure 1 is a broken view, with parts in section, of a seat back illustrating features of my invention.

Fig. 2 is a broken, sectional view of structure, similar to that illustrated in Fig. 1, showing a modified form of my invention;

Fig. 3 is an enlarged, sectional view of the structure illustrated in Fig. 2, taken on the line 3—3 thereof;

Fig. 4 is an enlarged, sectional view of the structure illustrated in Fig. 1, taken on the line 4—4 thereof.

Fig. 5 is a view of structure, similar to that illustrated in Fig. 4, showing a modified form thereof; and Fig. 6 is an enlarged broken view, with parts in section, of the structure illustrated in Fig. 2.

The seat back comprises a frame 10 embodying a strap 12 shaped to constitute the sides and top of the back frame structure. The front lower ends of the strap are bent inwardly at 13 to form shoulders against which a bottom cross element 14 may abut when welded, riveted, or otherwise secured thereto. The strap ends are extended below the portion having the flange 13 to provide the arms 15 which are pivotally secured to supporting feet 16 by rivets 17. The supporting feet 16 have an extending portion 18 above the rivet 17 which strikes against the flange 13 to prevent the rearward pivotal movement of the frame 10 beyond a desired position.

In Fig. 1, I have illustrated the lower cross member 14 as embodying a channel shaped element 20 having inwardly presented flanges 21 and an outer rolled channel section 22 provided with spaced portions crimped at 23 to form recesses 24 for receiving the ends of sinuous spring strips 25 which span the frame 10. A similar channel strip 26 is welded or otherwise secured to the inner face of the strap 10 along the top thereof having crimped portions 23 forming recesses 24 for receiving the other ends of the spring strips 25. After an end is inserted within a recess, the channel portion adjacent thereto is crimped against the protruding convolution of the spring for preventing the outward movement of the end from the recess.

The sinuous spring 25 embodies a wire which is bent in sinuous form and which is further formed on a small arc to provide a set which offers resistance to the spreading of the spring ends when the ends are fastened to the strip 26 and the bottom cross element 14. The stress thereby inherently provided normal to the length of the strip, which is augmented by the securing of the end portions to have the strip disposed on an arc of larger radius, provides the desirable amount of resistance to deflection in the resulting spring surface formed by a plurality of strips 25.

The trim material illustrated embodies front padding 28, rear padding 29, a front trim panel 31, and a rear trim panel 32 which are stitched together along the top and sides in pouch formation. This pouch-like trim and pad element is stretched over the frame 10 to a point above the end 18 of the feet 16 where it extends inwardly of the arm portion 15 to engage and be secured to the bottom cross element 14.

In the structure illustrated in Figs. 1 and 4, the ends of the back and front trim and padding material are inserted within the downwardly presented channel 20 and retained within the channel by a rubber sealing element 33 which is forced within the channel beyond the flanges 21 thereof to be retained against outward movement. Recesses 34 may be provided in the sides of the strip 33 for receiving the flanges 22 and the trim material, and lip portions 35 may be provided outwardly of the recesses to cover the lower surface of the cross element 14.

In Figs. 2 and 3, I have illustrated another form which my invention may assume, that wherein a strap 37 is employed in place of the channel member 20 for forming the lower cross element 14 of the frame. The sides of the strap 37 are welded or secured by rivets 19 to the lower ends of the strap 12 and a channel element 26, similar to that employed at the top of the strap 12, is welded or secured to the lateral extending portion of the strap 37. The ends of the spring elements 25 are secured in the elements 26 at the top and bottom of the frame in the manner explained hereinabove. In this particular construction, the ends of the pad and trim material 28, 29, 31, and 32, are joined below the strap 37 and are secured together by stitching or by other fastening means. It is within the purview of my invention to secure a tacking element to the underside of the laterally extending portion of the strap 37 to which the trim material may be directly tacked. Such a strip may be riveted to the strap 37 or may be encased in a metal sheath and welded thereto. In Fig. 5, I have shown such a tacking strip 38 employed in the channel element 20, illustrated in Fig. 4, to which the material is directly tacked. When such a tacking strip is employed, the resilient strip 33 for securing the materials in the channel is eliminated.

In Fig. 6, I have illustrated a further form of element 26, that wherein portions of the strip are extended, as at 39, at the bottom web of the channel portion of the strip. Projecting portions 39 are desirable in some constructions to permit the strip 26 to be secured to the frame elements by a projection welding operation. When the strip is to be secured on its side surface to a strap, as illustrated in Fig. 1, the projection portion 39 will extend from the side rather than from the bottom as illustrated in the figure.

The resulting seat formed in the manner herein described is exceedingly simple and economical of manufacture. Inverted U-shaped elements forming the side and top of the frame also form a support for the frame which may be riveted or pivoted to supporting feet. The frame is spanned by spring strips which are secured against material lateral displacement by clips 41 which join the adjacent strips, the end-most strips being secured to frame 12 preferably by coil springs 42. The springs 42 are secured to the frame by clips 43 which are welded or otherwise secured thereto. After the frame is constructed, a pouch-like pad and trim element is drawn over the top thereof, the open bottom portion being secured together below the lower cross element of the frame. Various means may be provided for effecting this securement, those illustrated embodying the clamping of the material within a channel by a resilient element, the securing of the ends to a tacking element, or the securing of the elements to each other by suitable fastening means.

While I have described and illustrated several embodiments of my invention, it will be apparent to those skilled in the art that various changes, omissions, additions, and substitutions may be made therein without departing from the spirit and scope of my invention, as set forth in the accompanying claims.

What is claimed is:

1. In a seat back construction, the combination with two U-shaped members nested together to form a continuous frame element outlining said back, channel strips having spaced recessed portions disposed on opposite sides of said frame element, sinuously bent wire forming spring strips having the ends secured in said recess portions forming a spring surface for said frame element, trim and pad material in the shape of a pouch drawn over said element with the ends secured together beyond the confines of said frame element.

2. In a cushion construction, the combination with two U-shaped elements formed of strip material joined together to form a continuous frame, a plurality of sinously bent wires forming spring strips, means on opposite sides of said frame for receiving and anchoring the ends of the strips, downwardly projecting elements on one of said U-shaped members for supporting the back, and cover material extending over said back and secured together at the edges about the periphery of said frame.

ALFRED H. HABERSTUMP.